(12) United States Patent
Kondou

(10) Patent No.: US 8,039,546 B2
(45) Date of Patent: Oct. 18, 2011

(54) MODIFIED NATURAL RUBBER LATEX AND METHOD FOR PRODUCING THE SAME, MODIFIED NATURAL RUBBER AND METHOD FOR PRODUCING THE SAME, RUBBER COMPOSITION AND TIRE

(75) Inventor: Hajime Kondou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 820 days.

(21) Appl. No.: 11/720,082

(22) PCT Filed: Nov. 25, 2005

(86) PCT No.: PCT/JP2005/021695
§ 371 (c)(1),
(2), (4) Date: May 24, 2007

(87) PCT Pub. No.: WO2006/057343
PCT Pub. Date: Jun. 1, 2006

(65) Prior Publication Data
US 2009/0227742 A1      Sep. 10, 2009

(30) Foreign Application Priority Data
Nov. 26, 2004   (JP) .................................. 2004-341617

(51) Int. Cl.
*C08C 19/22* (2006.01)
*C08K 3/00* (2006.01)

(52) U.S. Cl. ............... 524/575.5; 525/333.1; 525/333.9; 525/351

(58) Field of Classification Search ............... 524/575.5; 525/333.1, 333.9, 351
See application file for complete search history.

(56) References Cited

U.S. PATENT DOCUMENTS

| | | |
|---|---|---|
| 6,184,296 B1 | 2/2001 | Obrecht et al. |
| 2004/0266937 A1* | 12/2004 | Yagi et al. .................... 524/493 |

FOREIGN PATENT DOCUMENTS

| | | |
|---|---|---|
| GB | 820261 A | 9/1959 |
| GB | 820262 A | 9/1959 |
| GB | 1030196 A | 5/1966 |
| JP | 2-49040 A | 2/1990 |
| JP | 3-103402 A | 4/1991 |
| WO | WO 98/18860 A1 | 5/1998 |

* cited by examiner

*Primary Examiner* — Peter D Mulcahy
(74) *Attorney, Agent, or Firm* — Sughrue Mion, PPLC

(57) ABSTRACT

This invention provides a modified natural rubber latex formed by charging a polar group-containing mercapto compound into a natural rubber latex to add the polar group-containing mercapto compound to a natural rubber molecule in the natural rubber latex, a modified natural rubber formed by coagulating and drying the modified natural rubber latex, and the rubber composition using the modified natural rubber and being excellent in the low loss factor, wear resistance and fracture characteristics.

7 Claims, No Drawings

MODIFIED NATURAL RUBBER LATEX AND METHOD FOR PRODUCING THE SAME, MODIFIED NATURAL RUBBER AND METHOD FOR PRODUCING THE SAME, RUBBER COMPOSITION AND TIRE

TECHNICAL FIELD

This invention relates to a modified natural rubber latex and a method for producing the same, a modified natural rubber and a method for producing the same, and a rubber composition and a tire using the modified natural rubber, and more particularly to a rubber composition being excellent in the low loss factor, wear resistance and fracture resistance.

BACKGROUND ART

Lately, it is strongly demanded to reduce a fuel consumption of an automobile and hence a tire having a low rolling resistance is required. For this end, there is required a rubber composition having a low tan δ (hereinafter referred to as a low loss factor) and being excellent in the low heat buildup as a rubber composition used in a tread or the like of the tire. Also, the rubber composition for the tread is required to be excellent in the wear resistance and fracture characteristics in addition to the low loss factor. In order to improve the low loss factor, wear resistance and fracture characteristics of the rubber composition, it is effective to improve an affinity between a filler such as carbon black, silica or the like and a rubber component in the rubber composition.

For example, in order to improve the reinforcing effect with the filler by improving the affinity between the filler and the rubber component in the rubber composition, there are developed a synthetic rubber wherein the affinity for the filler is improved by a terminal modification, a synthetic rubber wherein the affinity for the filler is improved by copolymerizing with a functional group-containing monomer and so on.

On the other hand, a natural rubber is voluminously used while utilizing its excellent physical characteristics, but there is no technique wherein the affinity for the filler is improved by modifying the natural rubber itself to highly improve the reinforcing effect with the filler.

For example, there is proposed a technique for epoxidizing the natural rubber. In this technique, however, the affinity between the natural rubber and the filler cannot be sufficiently improved, so that the reinforcing effect with the filler cannot be sufficiently improved. Also, there is known a technique wherein a graft-polymerization is conducted by adding a vinyl-based monomer to a natural rubber latex (see JP-A-H05-287121, JP-A-H06-329702, JP-A-H09-025468, JP-A-2000-319339, JP-A-2002-138266 and JP-A-2002-348559). The grafted natural rubber obtained by this technique is put into a practical use as an adhesive or the like. In the grafted natural rubber, however, a large amount of the vinyl compound as a monomer (20-50% by mass) is grafted for changing the characteristics of the natural rubber itself, so that when it is compounded with a filler, the viscosity is largely increased to deteriorate the processability. Moreover, since the large amount of the vinyl compound is introduced into the molecular chain of the natural rubber, there are damaged the excellent physical characteristics inherent to natural rubber (viscoelasticity, stress-strain curve in a tensile test and the like).

DISCLOSURE OF THE INVENTION

It is, therefore, an object of the invention to solve the above-mentioned problems of the conventional techniques and to provide a rubber composition being excellent in the low loss factor, wear resistance and fracture characteristics as well as a tire using the rubber composition. Also, it is another object of the invention to provide a modified natural rubber suitable for a rubber component of the rubber composition and a method for producing the same, and a modified natural rubber latex capable of producing the modified natural rubber and a method for producing the same.

The inventor has made various studies in order to achieve the above objects and discovered that the low loss factor, wear resistance and fracture characteristics of the rubber composition can be highly improved by using as a rubber component of the rubber composition a modified natural rubber formed by adding a polar group-containing mercapto compound to a natural rubber molecule, and as a result the invention has been accomplished.

That is, the modified natural rubber latex according to the invention is formed by charging a polar group-containing mercapto compound into a natural rubber latex to add the polar group-containing mercapto compound to a natural rubber molecule in the natural rubber latex.

In a preferable embodiment of the modified natural rubber latex according to the invention, an amount of the polar group-containing mercapto compound added is 0.01-5.0% by mass based on the rubber component in the natural rubber latex.

In another preferable embodiment of the modified natural rubber latex according to the invention, the polar group of the polar group-containing mercapto compound is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group and alkoxysilyl group.

Also, the method for producing the modified natural rubber latex according to the invention is characterized by comprising the step of charging a polar group-containing mercapto compound into a natural rubber latex to add the polar group-containing mercapto compound to a natural rubber molecule in the natural rubber latex.

Moreover, the modified natural rubber according to the invention is formed by coagulating and drying the modified natural rubber latex, and the method for producing the modified natural rubber according to the invention is characterized by comprising the steps of coagulating and drying the modified natural rubber latex.

Furthermore, the rubber composition according to the invention is characterized by using the modified natural rubber, and the tire according to the invention is characterized by using the rubber composition in any tire member.

According to the invention, there can be provided a rubber composition using as a rubber component a modified natural rubber formed by adding a polar group-containing mercapto compound to a natural rubber molecule and being excellent in the low loss factor, wear resistance and fracture characteristics as well as a tire using the rubber composition. Also, there can be provided a modified natural rubber suitable for a rubber component of such a rubber composition and a method for producing the same, and a modified natural rubber latex capable of producing the modified natural rubber and a method for producing the same.

BEST MODE FOR CARRYING OUT THE INVENTION

The invention will be described in detail below. The modified natural rubber latex according to the invention is formed by charging a polar group-containing mercapto compound into a natural rubber latex to add the polar group-containing mercapto compound to a natural rubber molecule in the natural rubber latex, and the modified natural rubber according to the invention is formed by coagulating and drying the modified natural rubber latex, and the rubber composition according to the invention is characterized by using the modified natural rubber, and the tire according to the invention is characterized by using the rubber composition in any tire member. Since the polar group of the polar group-containing mercapto compound is excellent in the affinity for various fillers such as carbon black, silica and the like, the modified natural rubber in the modified natural rubber latex is high in the affinity for the various fillers as compared with the unmodified natural rubber. In the rubber composition of the invention using the modified natural rubber as a rubber component, therefore, the dispersibility of the filler into the rubber component is high and the reinforcing effect of the filler is sufficiently developed to make the wear resistance and the fracture resistance excellent and highly improve the low heat buildup (low loss factor). Also, the fracture resistance and wear resistance can be significantly improved while highly decreasing the rolling resistance by using the rubber composition in a tire, particularly a tread of the tire.

The natural rubber latex used in the modified natural rubber latex of the invention is not particularly limited and can include, for example, a field latex, an ammonia-treated latex, a centrifugally concentrated latex, a deproteinized latex treated with a surfactant or an enzyme, and a combination thereof.

The polar group-containing mercapto compound added to the natural rubber latex to conduct addition reaction to the natural rubber molecule in the natural rubber latex is not particularly limited as long as it has at least one mercapto group and a polar group except the mercapto group in its molecule. As a concrete example of the polar group are preferably mentioned amino group, imino group, nitrile group, ammonium group, imide group, amide group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group, alkoxysilyl group and so on. These polar group-containing mercapto compounds may be used alone or in a combination of two or more.

As the amino group-containing mercapto compound are mentioned mercapto compounds containing in the molecule at least one amino group selected from primary, secondary and tertiary amino groups. Among the mercapto compounds having the amino group, a tertiary amino group-containing mercapto compound is particularly preferable. As the primary amino group-containing mercapto compound are mentioned 4-mercaptoaniline, 2-mercaptoethylamine, 2-mercaptopropylamine, 3-mercaptopropylamine, 2-mercaptobutylamine, 3-mercaptobutylamine, 4-mercaptobutylamine and so on. As the secondary amino group-containing mercapto compound are mentioned N-methylaminoethanethiol, N-ethylaminoethanethiol, N-methylaminopropanethiol, N-ethylaminopropanethiol, N-methylaminobutanethiol, N-ethylaminobutanethiol and so on. As the tertiary amino group-containing mercapto compound are mentioned N,N-disubstituted aminoalkyl mercaptans such as N,N-dimethylaminoethanethiol, N,N-diethylaminoethanethiol, N,N-dimethylaminopropanethiol, N,N-diethylaminopropanethiol, N,N-dimethylaminobutanethiol, N,N-diethylaminobutanethiol and so on. Among these amino group-containing mercapto compounds, 2-mercaptoethylamine, N,N-dimethylaminoethanethiol and the like are preferable. These amino group-containing mercapto compounds may be used alone or in a combination of two or more.

As the nitrile group-containing mercapto compound are mentioned 2-mercaptopropanenitrile, 3-mercaptopropanenitrile, 2-mercaptobutanenitrile, 3-mercaptobutanenitrile, 4-mercaptobutanenitrile and so on. These nitrile group-containing mercapto compounds may be used alone or in a combination of two or more.

As the hydroxyl group-containing mercapto compound are mentioned mercapto compounds having in the molecule at least one hydroxyl group selected from primary, secondary and tertiary hydroxyl groups. As a concrete example of the hydroxyl group-containing mercapto compound are mentioned 2-mercaptoethanol, 3-mercapto-1-propanol, 3-mercapto-2-propanol, 4-mercapto-1-butanol, 4-mercapto-2-butanol, 3-mercapto-1-butanol, 3-mercapto-2-butanol, 3-mercapto-1-hexanol, 3-mercapto-1,2-propanediol, 2-mercaptobenzyl alcohol, 2-mercaptophenol, 4-mercaptophenol and so on. Among them, 2-mercaptoethanol and the like are preferable. These hydroxyl group-containing mercapto compounds may be used alone or in a combination of two or more.

As the carboxyl group-containing mercapto compound are mentioned mercaptoacetic acid, mercaptopropionic acid, thiosalicylic acid, mercaptomalonic acid, mercaptosuccinic acid, mercaptobenzoic acid and so on. Among them, mercaptoacetic acid and the like are preferable. These carboxyl group-containing mercapto compounds may be used alone or in a combination of two or more.

As the nitrogen-containing heterocyclic ring in the mercapto compound containing the nitrogen-containing heterocyclic group are mentioned pyrrole, histidine, imidazole, triazolidine, triazole, triazine, pyridine, pyrimidine, pyrazine, indole, quinoline, purine, phenazine, pteridine, melamine and so on. Moreover, the nitrogen-containing heterocyclic ring may include another heteroatom in its ring. A mercapto compound containing pyridyl group as the nitrogen-containing heterocyclic group includes 2-mercaptopyridine, 3-mercaptopyridine, 4-mercaptopyridine, 5-methyl-2-mercaptopyridine, 5-ethyl-2-mercaptopyridine and so on, and a mercapto compound containing another nitrogen-containing heterocyclic group includes 2-mercaptopyrimidine, 2-mercapto-5-methylbenzimidazole, 2-mercapto-1-methylimidazole, 2-mercaptobenzimidazole, 2-mercaptoimidazole and so on. Among them, 2-mercaptopyridine, 4-mercaptopyridine and the like are preferable. These nitrogen-containing heterocyclic group-containing mercapto compounds may be used alone or in a combination of two or more.

As the mercapto compound having the tin-containing group are mentioned tin-containing mercapto compounds such as 2-mercaptoethyl tri-n-butyltin, 2-mercaptoethyl trimethyltin, 2-mercaptoethyl triphenyltin, 3-mercaptopropyl tri-n-butyltin, 3-mercaptopropyl trimethyltin, 3-mercaptopropyl triphenyltin and so on. These tin-containing mercapto compounds may be used alone or in a combination of two or more.

As the alkoxysilyl group-containing mercapto compound are mentioned 3-mercaptopropyl trimethoxysilane, 3-mercaptopropyl triethoxysilane, 3-mercaptopropyl methyl dimethoxysilane, 3-mercaptopropyl dimethyl methoxysilane, 2-mercaptoethyl trimethoxysilane, 2-mercaptoethyl triethoxysilane, mercaptomethyl methyl diethoxysilane, mercaptomethyl trimethoxysilane and so on. Among them, 3-mercaptopropyl trimethoxysilane and the like are preferable. These alkoxysilyl group-containing mercapto compounds may be used alone or in a combination of two or more.

In the invention, a solution formed by adding water and if necessary an emulsifying agent to the natural rubber latex is commonly added with the polar group-containing mercapto compound, and stirred at a given temperature to conduct addition reaction of the polar group-containing mercapto compound to a double bond in the main chain of the natural rubber molecule in the natural rubber latex. In the addition of the polar group-containing mercapto compound to the natural rubber latex, the emulsifying agent may be previously added to the natural rubber latex, or the polar group-containing mercapto compound may be emulsified with the emulsifying agent and then added to the natural rubber latex. Moreover, an organic peroxide may be further added, if necessary. The emulsifying agent usable in the emulsification of the natural rubber latex and/or the polar group-containing mercapto compound is not particularly limited and includes nonionic surfactants such as polyoxyethylene lauryl ether and the like.

In order to improve the low loss factor and the wear resistance of the rubber composition by compounding the filler such as carbon black, silica or the like into the modified natural rubber obtained from the modified natural rubber latex without deteriorating the processability, it is important to evenly introduce a small amount of the polar group-containing mercapto compound into each of the natural rubber molecules. Therefore, the above modification reaction is preferably conducted with stirring. For example, the aforementioned components such as the natural rubber latex, the polar group-containing mercapto compound and the like are charged into a reaction vessel and reacted at 30 to 80° C. for 10 minutes to 24 hours to obtain the modified natural rubber latex wherein the polar group-containing mercapto compound is added to the natural rubber molecule. The thus obtained modified natural rubber latex may be used at a latex state as it is, or may be used at a solid state after the coagulation and drying. In case of applying to the rubber composition, it is preferably used as a solid rubber. In case of using as the solid rubber, the modified natural rubber latex is coagulated and washed, and then dried by using a drying machine such as a vacuum drier, an air drier, a drum drier or the like to obtain the modified natural rubber at a solid state. The coagulating agent used for coagulating the modified natural rubber latex is not particularly limited, but includes acids such as formic acid, sulfuric acid and the like, and salts such as sodium chloride and the like.

In the modified natural rubber latex and modified natural rubber, the amount of the polar group-containing mercapto compound added is preferably within a range of 0.01-5.0% by mass, and more preferably 0.01-1.0% by mass based on the rubber component in the natural rubber latex. When the amount of the polar group-containing mercapto compound added is less than 0.01% by mass, the low loss factor and the wear resistance of the rubber composition may not be sufficiently improved. While, when the amount of the polar group-containing mercapto compound added exceeds 5.0% by mass, the physical properties inherent to the natural rubber such as viscoelasticity, S-S characteristic (stress-strain curve in the tensile testing machine) and so on are largely changed to diminish the excellent physical properties inherent to the natural rubber and also the processability of the rubber composition may be largely deteriorated.

The rubber composition according to the invention is characterized by using the modified natural rubber, and preferable to further contain a filler. The amount of the filler compounded is not particularly limited, but is preferably within a range of 5-100 parts by mass, and more preferably 10-70 parts by mass based on 100 parts by mass of the modified natural rubber. When the amount of the filler compounded is less than 5 parts by mass, the sufficient reinforcing property may not be obtained, while when it exceeds 100 parts by mass, the processability may be deteriorated.

As the filler used in the rubber composition according to the invention are mentioned carbon black and inorganic fillers. Moreover, as the inorganic filler are mentioned silica and inorganic compounds represented by the following formula (I):

$$nM \cdot xSiO_y \cdot zH_2O \quad (I)$$

[wherein M is at least one selected from the group consisting of a metal of aluminum, magnesium, titanium, calcium or zirconium, oxides and hydroxides of these metals, their hydrates, and carbonates of these metals, n is an integer of 1-5, x is an integer of 0-10, y is an integer of 2-5, and z is an integer of 0-10]. These fillers may be used alone or in a combination of two or more.

As the carbon black are mentioned GPF, FEF, SRF, HAF, ISAF and SAF grade carbon blacks and so on. As the silica are mentioned precipitated silica, fumed silica, colloidal silica and so on. As the inorganic compound of the formula (I) are mentioned alumina ($Al_2O_3$) such as γ-alumina, α-alumina or the like; alumina monohydrate ($Al_2O_3 \cdot H_2O$) such as boehmite, diaspore or the like; aluminum hydroxide [$Al(OH)_3$] such as gibbsite, bayerite or the like; aluminum carbonate [$Al_2(CO_3)_3$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophillite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 \cdot 5H_2O$, and so on), magnesium silicate ($Mg_2SiO_4$, $MgSiO_3$, and so on), calcium silicate ($Ca_2SiO_4$, and so on), aluminum calcium silicate ($Al_2O_3 \cdot CaO \cdot 2SiO_2$, and so on), magnesium calcium silicate ($CaMgSiO_4$), calcium carbonate ($CaCO_3$), zirconium oxide ($ZrO_2$), zirconium hydroxide [$ZrO(OH)_2 \cdot nH_2O$], zirconium carbonate [$Zr(CO_3)_2$], and crystalline aluminosilicates containing charge-compensating hydrogen, alkali metal or alkaline earth metal such as various zeolites.

The rubber composition of the invention may be properly compounded with additives usually used in the rubber industry such as an antioxidant, a softener, a silane coupling agent, stearic acid, zinc white, a vulcanization accelerator, a vulcanizing agent and the like within a scope of not damaging the object of the invention in addition to the modified natural rubber and the filler. As these additives can be preferably used commercially available ones. The rubber composition of the invention can be produced by compounding the modified natural rubber with the various additives properly selected if necessary and milling, warming, extruding and so on.

The tire according to the invention is characterized by using the rubber composition, and preferably using the rubber composition in a tread. The tire using the rubber composition in the tread is excellent in the low fuel consumption, fracture characteristics and wear resistance. The tire according to the invention is not particularly limited as long as it uses the above-mentioned rubber composition in any tire member, and can be produced by the usual method. As a gas filled into the tire can be used usual air or air having a regulated partial oxygen pressure but also inert gases such as nitrogen, argon, helium and so on.

EXAMPLES

The following examples are given in illustration of the invention and are not intended as limitations thereof.

Production Example 1

Modifying Step of Natural Rubber Latex

To a field latex is added water to obtain a latex having a dry rubber concentration of 30%. 2000 g of the latex is charged into a stainless reaction vessel provided with a stirrer and a temperature-regulating jacket, added with an emulsion previously formed by adding 10 mL of water and 90 mg of an emulsifying agent [Emulgen 1108, made by Kao Corporation] to 1.2 g of 2-mercaptoethylamine, and reacted at 60° C. for 8 hours with stirring to obtain a modified natural rubber latex.

(Coagulating and Drying Steps)

Then, the modified natural rubber latex is coagulated by adding formic acid to adjust pH to 4.7. The thus obtained solid is treated with a clapper 5 times, crumbed through a shredder and dried by a hot air drier at 110° C. for 210 minutes to obtain a modified natural rubber A. An analysis using a pyrolysis gas chromatography-mass spectrometry reveals that the amount of the mercapto compound added in the resulting modified natural rubber A is 0.16% by mass based on the rubber component in the natural rubber latex.

Production Examples 2-7

Modified natural rubbers B-G are obtained in the same manner as in Production Example 1 except that a polar group-containing mercapto compound shown in Table 1 is added at an amount shown in Table 1 instead of 1.2 g of 2-mercaptoethylamine as a polar group-containing mercapto compound. Also, the amounts of the mercapto compound added in the modified natural rubbers B-G are analyzed in the same manner as in the modified natural rubber A to obtain the results shown in Table 1.

Production Example 8

A natural rubber H is prepared by directly coagulating and drying the natural rubber latex without the modifying step.

Then, a rubber composition having a compounding recipe as shown in Table 2 is prepared by milling in the plastomill, and the Mooney viscosity, tensile strength (Tb), tan δ and wear resistance are measured and evaluated by the following methods with respect to the rubber composition. The results of the rubber compositions according to a recipe 1 are shown in Table 3, and the results of the rubber compositions according to a recipe 2 are shown in Table 4.

(1) Mooney Viscosity

The Mooney viscosity $ML_{1+4}$ (130° C.) of the rubber composition is measured at 130° C. according to JIS K6300-1994.

(2) Tensile Strength

With respect to a vulcanized rubber obtained by vulcanizing the rubber composition at 145° C. for 33 minutes, the tensile test is conducted according to JIS K 6301-1995 to measure a tensile strength (Tb). The larger the tensile strength, the better the fracture resistance.

(3) Tan δ

With respect to a vulcanized rubber obtained by vulcanizing the rubber composition at 145° C. for 33 minutes, a loss tangent (tan δ) is measured at a temperature of 50° C., a strain of 5% and a frequency of 15 Hz by using a viscoelasticity measuring device [manufactured by RHEOMETRICS Corporation]. The smaller the tan δ, the better the low loss factor.

(4) Wear Resistance

The wear resistance is evaluated by measuring a worn amount of a vulcanized rubber, which is obtained by vulcanizing the rubber composition at 145° C. for 33 minutes, at a slip ratio of 60% and room temperature by means of a Lambourn abrasion tester, and shown by an index on the basis that an inverse number of the worn amount of Comparative Example 1 is 100 in Table 3 and an inverse number of the worn amount of Comparative Example 2 is 100 in Table 4, respectively. The larger the index value, the less the worn amount and the better the wear resistance.

TABLE 1

| | Product | Polar group-containing mercapto compound Kind | Amount charged (g) | Amount added (mass %) |
|---|---|---|---|---|
| Production Example 1 | Modified natural rubber A | 2-mercaptoethylamine | 1.2 | 0.16 |
| Production Example 2 | Modified natural rubber B | N,N-dimethylamino-ethanethiol | 1.7 | 0.23 |
| Production Example 3 | Modified natural rubber C | 2-mercaptopyridine | 1.8 | 0.25 |
| Production Example 4 | Modified natural rubber D | 4-mercaptopyridine | 1.8 | 0.25 |
| Production Example 5 | Modified natural rubber E | Mercaptoethanol | 1.3 | 0.17 |
| Production Example 6 | Modified natural rubber F | Mercaptoacetic acid | 1.5 | 0.19 |
| Production Example 7 | Modified natural rubber G | 3-mercaptopropyl trimethoxysilane | 3.2 | 0.42 |
| Production Example 8 | Natural rubber H | — | — | — |

TABLE 2

| | Amount compounded (parts by mass) | |
|---|---|---|
| | Recipe 1 | Recipe 2 |
| Rubber component *1 | 100 | 100 |
| Carbon black N339 | 50 | — |
| Silica *2 | — | 55 |
| Silane coupling agent *3 | — | 5.5 |
| Aromatic oil | 5 | 10 |
| Stearic acid | 2 | 2 |
| Antioxidant 6C *4 | 1 | 1 |
| Zinc white | 3 | 3 |
| Vulcanization accelerator DZ *5 | 0.8 | — |
| Vulcanization accelerator DPG *6 | — | 1 |
| Vulcanization accelerator DM *7 | — | 1 |
| Vulcanization accelerator NS *8 | — | 1 |
| Sulfur | 1 | 1.5 |

*1 Kinds of the rubber component used are shown in Tables 3 and 4.

*2 "Nipsil AQ" manufactured by Nippon Silica Industrial Co., Ltd.

*3 "Si69" manufactured by Degussa, bis(3-triethoxysilylpropyl) tetrasulfide.

*4 N-(1,3-dimethylbutyl)-N'-phenyl-p-phenylenediamine.

*5 N,N'-dicyclohexyl-2-benzothiazolyl sulfenamide.

*6 Diphenyl guanidine.

*7 Dibenzothiazyl disulfide.

*8 N-t-butyl-2-benzothiazyl sulfenamide.

TABLE 3

|  | Example 1 | Example 2 | Example 3 | Example 4 | Example 5 | Example 6 | Comparative Example 1 |
|---|---|---|---|---|---|---|---|
| Compounding recipe | | | | Recipe 1 | | | |
| Rubber component [(modified) natural rubber] | A | B | C | D | E | F | H |
| Mooney viscosity $ML_{1+4}$ (130° C.) | 77 | 79 | 71 | 72 | 76 | 79 | 76 |
| Tb (MPa) | 27.4 | 27.3 | 27.6 | 27.6 | 26.8 | 26.9 | 25.4 |
| tan δ | 0.158 | 0.156 | 0.148 | 0.149 | 0.165 | 0.163 | 0.192 |
| Wear resistance (index) | 121 | 123 | 126 | 125 | 115 | 117 | 100 |

TABLE 4

|  | Example 7 | Example 8 | Example 9 | Example 10 | Example 11 | Example 12 | Example 13 | Comparative Example 2 |
|---|---|---|---|---|---|---|---|---|
| Compounding recipe | | | | | Recipe 2 | | | |
| Rubber component [(modified) natural rubber] | A | B | C | D | E | F | G | H |
| Mooney viscosity $ML_{1+4}$ (130° C.) | 90 | 91 | 82 | 83 | 91 | 92 | 93 | 88 |
| Tb (MPa) | 25.1 | 25.3 | 25.0 | 25.1 | 25.2 | 24.9 | 25.4 | 23.9 |
| tan δ | 0.115 | 0.109 | 0.105 | 0.106 | 0.110 | 0.112 | 0.106 | 0.138 |
| Wear resistance (index) | 119 | 123 | 127 | 125 | 123 | 120 | 126 | 100 |

As seen from the comparison of Examples with Comparative Example in each of Tables 3 and 4, the fracture characteristics, low loss factor and wear resistance of the rubber composition can be highly improved by using the modified natural rubber modified with the polar group-containing mercapto compound instead of the natural rubber.

The invention claimed is:

1. A modified natural rubber latex formed by gadding a polar group-containing mercapto compound into a natural rubber latex whereby the polar group-containing mercapto compound is addition-reacted to a natural rubber molecule in the natural rubber latex, wherein an amount of the polar group-containing mercapto compound added is not less than 0.01% by mass but is less than 5.0% by mass based on a rubber component in the natural rubber latex.

2. A modified natural rubber latex according to claim 1, wherein the polar group of the polar group-containing mercapto compound is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group and alkoxysilyl group.

3. A method for producing a modified natural rubber latex, which comprises the step of adding a polar group-containing mercapto compound into a natural rubber latex whereby the polar group-containing mercapto compound is addition-reacted to a natural rubber molecule in the natural rubber latex, wherein an amount of the polar group-containing mercapto compound added is not less than 0.01% by mass but less than 5.0% by mass based on a rubber component in the natural rubber latex.

4. A modified natural rubber formed by coagulating and drying a modified natural rubber latex as claimed in any one of claims 1-2.

5. A method for producing a modified natural rubber, which comprises the steps of coagulating and drying a modified natural rubber latex as claimed in any one of claims 1-2.

6. A rubber composition using a modified natural rubber as claimed in claim 4.

7. A tire characterized by using a rubber composition as claimed in claim 6 in any tire member.

* * * * *